United States Patent [19]

Gates et al.

[11] Patent Number: 5,276,443
[45] Date of Patent: Jan. 4, 1994

[54] PARALLEL PORT MULTIPLEXOR FOR PC PARALLEL PORT

[75] Inventors: Dirk I. Gates, Woodland Hills; James K. Matthews, Calabases; Monte A. Pooley, Newbury Park; David B. Rosen, Agoura Hills, all of Calif.

[73] Assignee: Xircom, Inc., Calabasas, Calif.

[21] Appl. No.: 675,688

[22] Filed: Mar. 27, 1991

[51] Int. Cl.$^5$ .............................................. H04Q 1/00
[52] U.S. Cl. ......................... 340/825.06; 340/825.03; 307/125; 439/502; 439/620; 375/36; 200/51.04
[58] Field of Search ............... 340/825.06, 825.03, 340/825.21; 307/125; 439/44, 49, 502, 620; 375/36; 200/51.02, 51.03, 51.04, 51.05, 51.06

[56] References Cited

U.S. PATENT DOCUMENTS 4,446,459 5/1984 Bond, Jr. et al. .............. 340/825.21
4,607,379 8/1986 Marshall, Jr. et al. .............. 375/36
5,107,260 4/1992 Meissner ...................... 340/825.03

FOREIGN PATENT DOCUMENTS 0002739 1/1990 Japan ........................ 375/36

OTHER PUBLICATIONS

"Black Box Catalog" Jul. 1985 p. 78 Port expander.
"Basic Electronics Technology" 1985 pp. 379-403 by Radio Shack.
Radio Shack Catalog 1991, p. 171 "printer selector".

Primary Examiner—Donald J. Yusko
Assistant Examiner—Brian Zimmerman
Attorney, Agent, or Firm—Freilich Hornbaker Rosen

[57] ABSTRACT

A multiplexor for use with a computer having a parallel port, for providing multiple separately addressable auxiliary parallel ports.

9 Claims, 8 Drawing Sheets

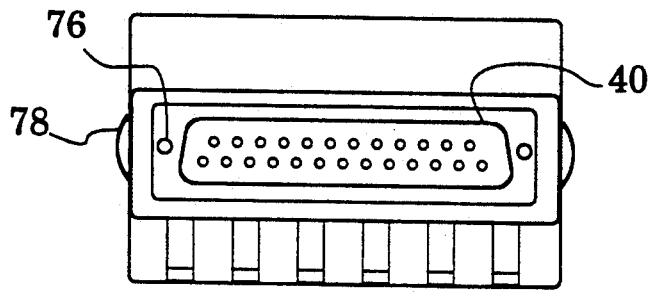
FIG. 2B
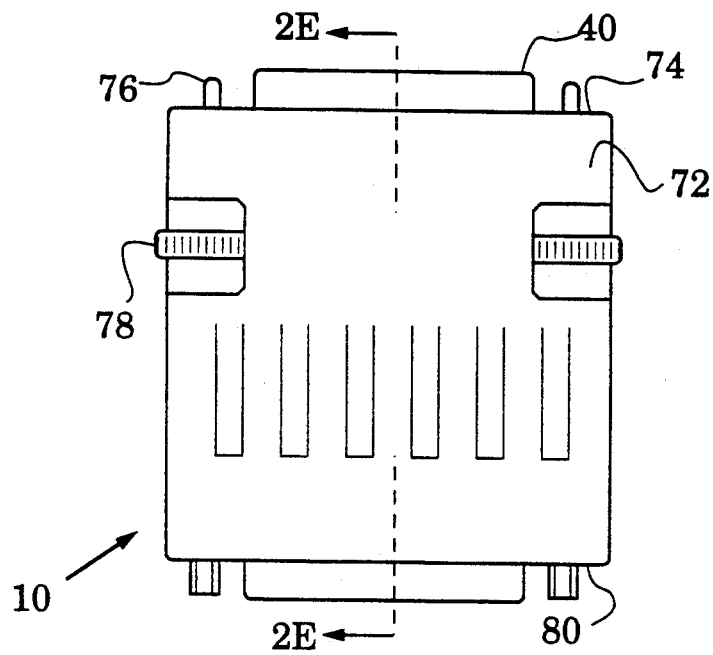 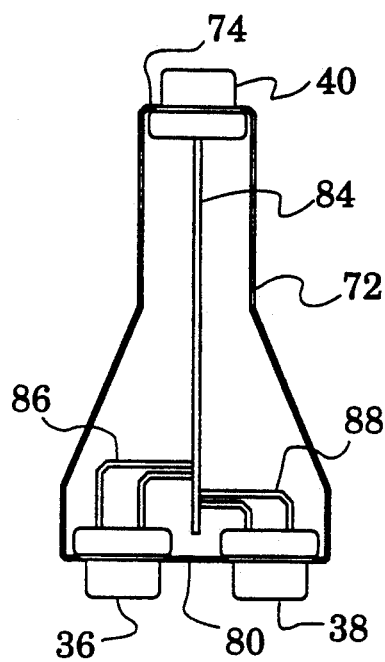
FIG. 2C   FIG. 2E
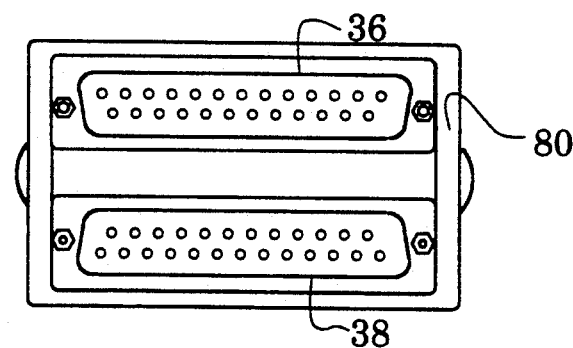
FIG. 2D

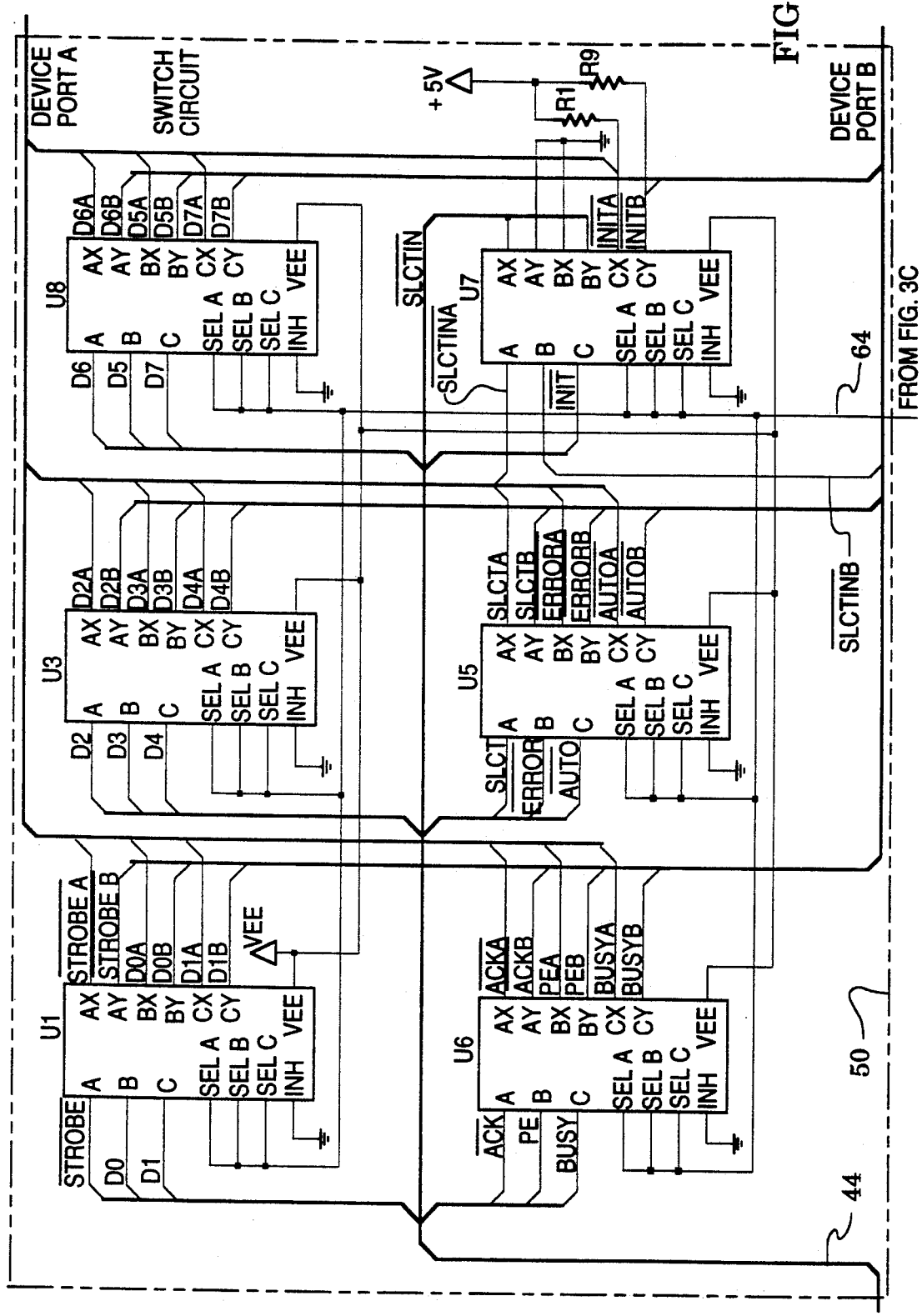

FIG. 3C

PARALLEL PORT MULTIPLEXOR FOR PC PARALLEL PORT

FIELD OF THE INVENTION

This invention relates to multiplexor apparatus, for use with a computer having a parallel port, for providing multiple separately addressable auxiliary parallel ports.

BACKGROUND OF THE INVENTION

Commercially marketed personal computers are generally equipped with an industry standard parallel port for driving a peripheral device such as a printer, plotter, or local area network (LAN) adapter, such as the Xircom Pocket LAN Adapter. Although such computers are usually capable of selectively driving, via software, multiple logical parallel ports, generally designated LPT1, LPT2, and LPT3, they frequently come equipped with only a single physical parallel port. The industry standard physical parallel port utilizes a 25 pin D shell female connector. A cable having a mating male connector is typically used to connect the computer parallel port to a peripheral device.

At any one time, a single parallel port can only control a single peripheral device. Thus, a computer equipped with only one physical parallel port can connect to only a single printer. In order to facilitate connection of the computer to multiple peripheral devices, various manufacturers have marketed switch boxes which enable a user to manually switch a single input port to any one of N output ports. Such switch boxes can functionally connect only one peripheral device at a time to the computer, so therefore only one such device can be active at a time. The user must manually toggle the switch box to select a new active connection.

Because certain peripheral devices, such as the aforementioned network adapter, must be accessible to the computer at all times, conventional manually operated switch boxes are not suitable for use with these devices.

SUMMARY OF THE INVENTION

The present invention is directed to a multiplexor adapted to be connected to a computer's parallel port to provide two or more separately addressable auxiliary parallel ports.

A multiplexor in accordance with the invention includes a host connector and two or more device connectors. The host connector typically comprises a multi pin male connector adapted to connect to a computer's parallel port female connector. The device connectors, each associated with a different auxiliary port, typically comprise female connectors adapted to connect via cables to separate peripheral devices.

In a preferred embodiment of the invention, the multiplexor includes a common housing configured so that the host connector is externally accessible for direct connection to a computer's parallel port connector. The device connectors are externally accessible for connection to parallel cables.

A preferred multiplexor in accordance with the invention includes switch circuitry and control circuitry. The switch circuitry selectively defines either a first or second state for respectively connecting the host connector to either auxiliary port A or B. Assuming auxiliary port A to represent the default condition, then in response to the computer addressing auxiliary port B, the control circuitry will automatically switch the switch circuitry in a manner which is essentially transparent both to the computer and the user.

In accordance with the preferred embodiment, the control circuitry responds to encoded signals on the computer's parallel port data lines.

In accordance with a significant aspect of the preferred embodiment, the multiplexor operates without external electric power. Rather, power supply circuitry incorporated in the multiplexor draws electrical energy from the computer's parallel port signal lines. A program executed by the computer ensures that when its parallel port is not otherwise in use, its signal lines supply sufficient electric current to charge energy storage means in the power supply circuitry.

DESCRIPTION OF THE DRAWING

FIGS. 2A, 2B, 2C and 2D respectively comprise isometric, front, top and rear views of a preferred multiplexor embodiment in accordance with the invention;

FIG. 2E is a sectional view taken substantially along the plane 2E—2E of FIG. 2C;

FIGS. 3B, 3C, 3D are schematic diagrams respectively of the switch, control, and power supply circuits of FIG. 3A.

DETAILED DESCRIPTION

Figure 1:
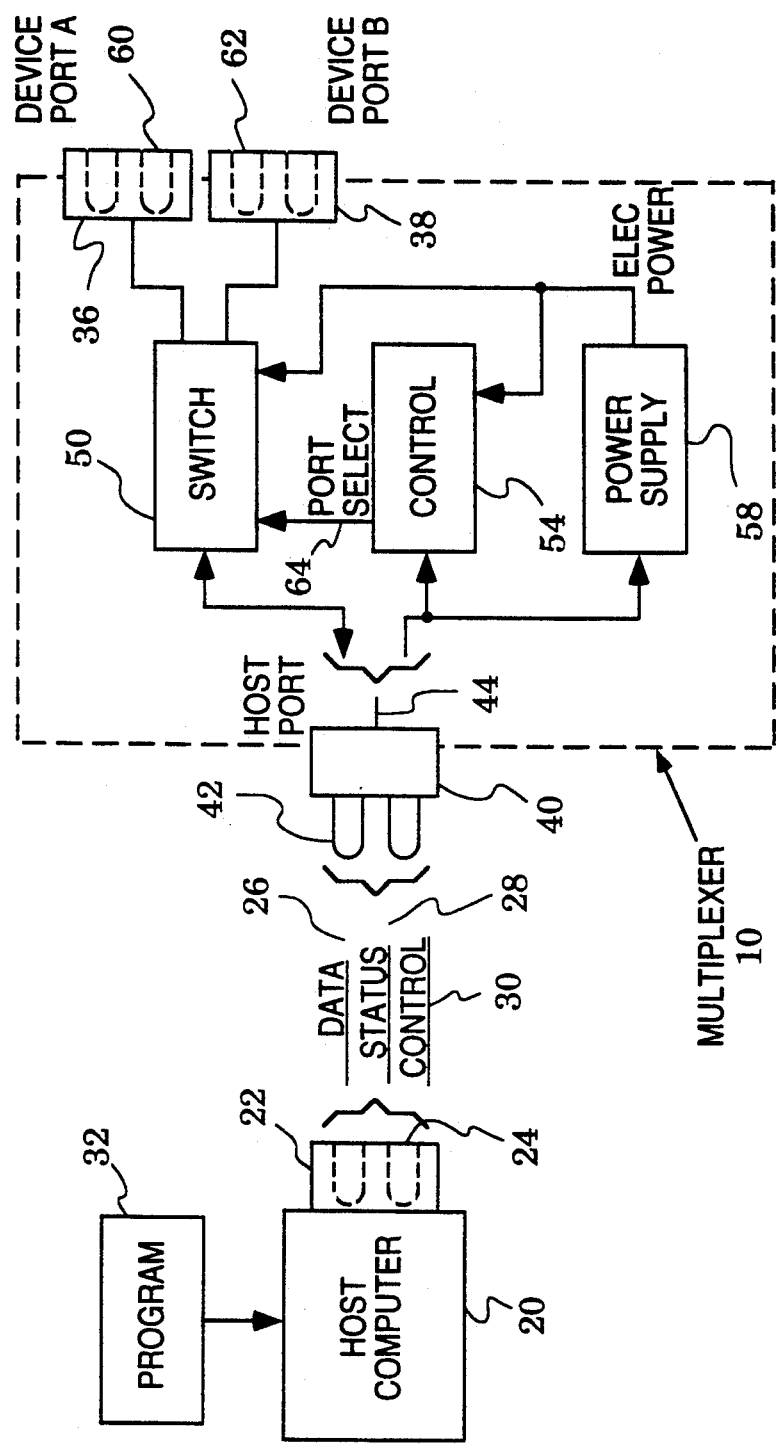
FIG. 1 is a functional block diagram of a multiplexor in accordance with the present invention.
Figure 2A:
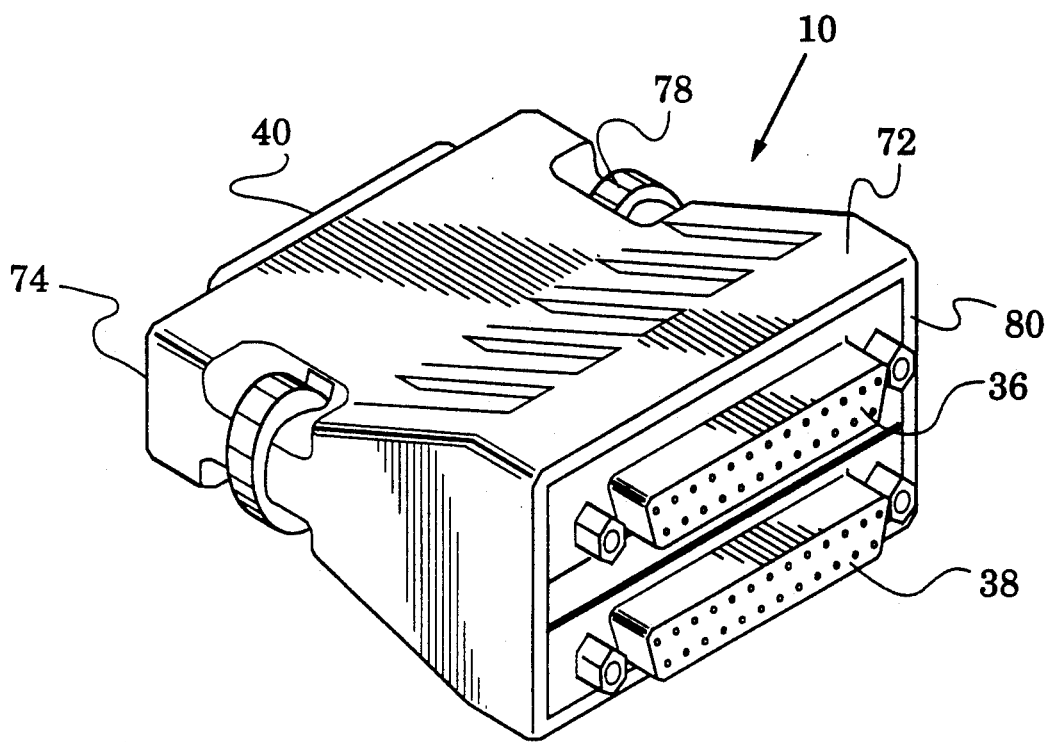

Attention is initially called to FIG. 1 comprising a functional block diagram of a multiplexor 10 in accordance with the present invention. The multiplexor 10 is depicted as being connected to a typical host computer 20, e.g. an IBM compatible MS-DOS computer, via a parallel port connector 22. As is well known, an industry standard parallel port connector 22 comprises a D shell female connector having 25 pin receiving sockets 24. The following table describes the typical pin/socket assignment of an industry standard parallel port connector:

| Pin No. | I/O | Signal Name | Pin No. | I/O | Signal Name |
|---|---|---|---|---|---|
| 1 | I/O | -STROBE | 14 | O | -AUTO FD XT |
| 2 | I/O | Data 0 | 15 | I | -ERROR |
| 3 | I/O | Data 1 | 16 | O | INT |
| 4 | I/O | Data 2 | 17 | O | -SLCT IN |
| 5 | I/O | Data 3 | 18 | NA | Ground |
| 6 | I/O | Data 4 | 19 | NA | Ground |
| 7 | I/O | Data 5 | 20 | NA | Ground |
| 8 | I/O | Data 6 | 21 | NA | Ground |
| 9 | I/O | Data 7 | 22 | NA | Ground |
| 10 | I | -ACK | 23 | NA | Ground |
| 11 | I | BUSY | 24 | NA | Ground |
| 12 | I | PE | 25 | NA | Ground |
| 13 | I | SLCT | | | |

With the foregoing pin assignments, pins generally viewed as comprising data lines 26, pins 10–13 and 15 as comprising status lines 28, and pins 1, 14, 16 and 17 as comprising control lines 30. The signals appearing on the data, status and control lines of connector 22 are generally determined by the program 32 being executed by computer 20. Typical programs have the capability of addressing different logical parallel ports, generally designated as LPT1 or LPT2 or LPT3. In accordance with the present invention, the multiplexor 10 enables the program/computer to address multiple logical ports, e.g. both LPT1 and LPT2, even though the computer 20 may be equipped with only a single physical parallel port connector 22. If the computer 20 is equipped with two parallel port connectors, then multiplexor 10 enables it to function with three separately addressable parallel ports LLPT1, LPT2, and LPT3. As will be seen, the multiplexor 10 operates essentially transparently to the user and to the computer 20, automatically connecting the data, control, and status signals from connector 22 to appropriate auxiliary device port connectors 36, 38 (FIG. 1).

In addition to device port connectors 36 and 38, multiplexor 10 includes a host port connector 40, typically a male connector having external signal lines in the form of pins 42 adapted to be received in and electrically connected to sockets 24 of the computer connector 22. Internal signal lines 44 (including individual lines corresponding to the aforementioned pin assignments) from the host connector 40 are connected to three functional electronic circuits of the multiplexor 10. More particularly, the internal signal lines 44 are connected to a nonmanual switch circuit 50, a control circuit 54, and a power supply circuit 58.

The switch circuit 50 selectively defines either a first or second state to respectively connect the internal signal lines 44 to either device port connector 36 or device port connector 38. These device port connectors are both conventional female connectors, respectively having sockets 60 and 62, adapted to mate with the male connector ends of conventional parallel cables (not shown).

The state of switch circuit 50 is controlled by control circuit 54 responsive to signals appearing on the internal signal lines 44. In accordance with a preferred embodiment of the invention depicted in FIG. 3A-3D, the control circuit 54 responds to encoded data distributed on the internal data signal lines. The control circuit 54 controls the state of switch circuit 50 via the port select conductor 64.

Electrical energy to drive the switch circuit 50 and the control circuit 54 is provided by the power supply circuit 58 More specifically, as will be seen hereinafter, the power supply circuit 58 draws electrical energy from the computer parallel port connector 22 signal lines. In accordance with the preferred embodiment of the invention, the program 32 ensures that when the computer's parallel port 22 is not otherwise in use, its signal lines supply sufficient electric current to charge energy storage means within the power supply circuit 58.

Attention is now directed to FIGS. 2A, 2B, 2C and 2D which respectively comprise isometric, front, top, and rear views of a preferred multiplexor apparatus 10 in accordance with the present invention. The apparatus 10 is comprised of a housing 72 supporting the multipin host connector 40 at the front face 74 thereof. As can be seen, the host connector 40 comprises a 25 pin D shell male connector configured to mate with the computer parallel port connector 22. Captive screws 76, each supporting a thumb wheel 78, are mounted in the housing 72 adjacent to connector 40 for mating with threaded holes (not shown) conventionally provided on either side of a standard computer parallel port connector.

FIG. 2D illustrates the rear face 80 of the multiplexor apparatus 10 showing the first and second device port connectors 36, 38 externally accessible thereat. Each of the device port connectors 36, 38 comprises a 25 pin D shell female connector configured for connection to a peripheral device via a conventional parallel cable.

FIG. 2E is a sectional view taken substantially along the plane 2E—2E of FIG. 2C. FIG. 2E depicts a circuit board 84 mounted within the housing 72, extending from proximate the front face 74 to proximate the rear face 80. The host connector 40 is electrically and physically mounted on the circuit board 84. Flexible leads 86 and 88 respectively connect the circuit board 84 to the device port connector 36, 38. The aforementioned switch circuit 50, control circuit 54, and power supply circuit 58, all to be discussed greater detail hereinafter, are formed on the circuit board 84.

The dimensions of the housing 72 are primarily dictated by the dimensions of the industry standard physical parallel port connector. Thus, for example, the front face 74 of the connector 40 is substantially rectangular and measures approximately 2.7 inches by 0.7 inches Similarly, the rear face 80 is substantially rectangular and measures approximately 2.3 inches by 1.4 inches. The dimension of housing 72 between the front face 74 and rear face 80 typically measures about 2.3 inches.

Attention is now directed to FIGS. 3A-3D which illustrate a schematic diagram showing the multiplexor 10 of FIGS. 1 and 2A-2E in greater detail. Note in FIG. 3 that the internal signal lines 44 from host connector 40 are connected to the input of each of switch circuit 50, control circuit 54, and power supply circuit 58.

Switch circuit 50, as depicted in FIG. 3B, is comprised of multiple integrated circuit chips, respectively denominated U1, U3, U8, U6, U5, and U7. In the depicted preferred embodiment, each of these chips comprises a Signetics 74C 4053 triple 2-channel multiplexer/demultiplexer, having three inputs respectively denominated A, B, and C and six outputs respectively denominated AX, AY, BX, BY, CX, CY. The signal level on the port select output conductor 64 of the control circuit 54 determines whether a signal applied to the input of one of the switch circuit chips is directed to the X or Y output. More specifically, note for example in FIG. 3B that data line D1 is applied to input C of integrated circuit chip U1. Its output will appear on either output terminal CX as signal D1A (directed to device port A) or CY as signal D1B (directed to device port B), depending upon the signal level on the port select conductor 64. The X outputs of the switch circuit 50 integrated circuits are all connected to device port A connector 36 whereas the Y outputs are all connected to the device port B connector 38.

In accordance with the invention, the state of the switch circuit 50, i.e. whether it selects the X or Y output terminals to be active, is determined by the control circuit 54. Control circuit 54 in accordance with the invention operates to decode switching signals encoded on data lines D2 and D3. In order for the computer 20 to switch the active device port, e.g. from device port A to device port B, it provides encoded address signals to data lines D2 and D3 (of internal signal lines 44) without accompanying transitions on status and control signal lines STROBE, SLCTIN, and AUTO.

The exemplary control circuit 54 depicted in FIG. 3C is comprised of four flip-flops 90, 92, 94, 96 implemented by integrated circuits U2 and U4, each shown as a Signetics 74HCT74 dual D-type flip-flop, positive edge triggered. The function of control circuit 54 is to detect a particular bit string on data line D2 (i.e. 0111)

while data line D3 is toggled to provide periodic positive going edges.

Data line D2 is connected to the data inputs of flip-flops 90 and 96. The data output of flip-flop 90 is connected to the data input of lip-flop 92 whose data output is connected to the data input of flip-flop 94. Data line D3 is connected to the clock input of flip-flops 90, 92, 94. The data output of flip-flop 94 is connected to the clock input of flip-flop 96. Thus, when flip-flop 74 provides a positive going edge (attributable to the initial 0 in the bit string on D2) coincident with D2=1, then the data output (i.e. PORTBSEL 64) will go high to switch circuit 50 to activate device port B.

It should be noted that control lines STROBE, SLCTIN and AUTO are gated through integrated circuit U10 to the clear (CLR) inputs of flip-flops 90, 92, 94. The purpose of this gating is to assure that if the STROBE line is active or if SLCTIN or AUTO become active (indicative of activity on the parallel port), then flip-flops 90, 92, 94 are reset to prevent generation of the PORTBSEL switching signal. In other words, it is intended that control circuit 64 be able to switch circuit 50 only when the computers parallel port is not otherwise in use.

Figure 3A:
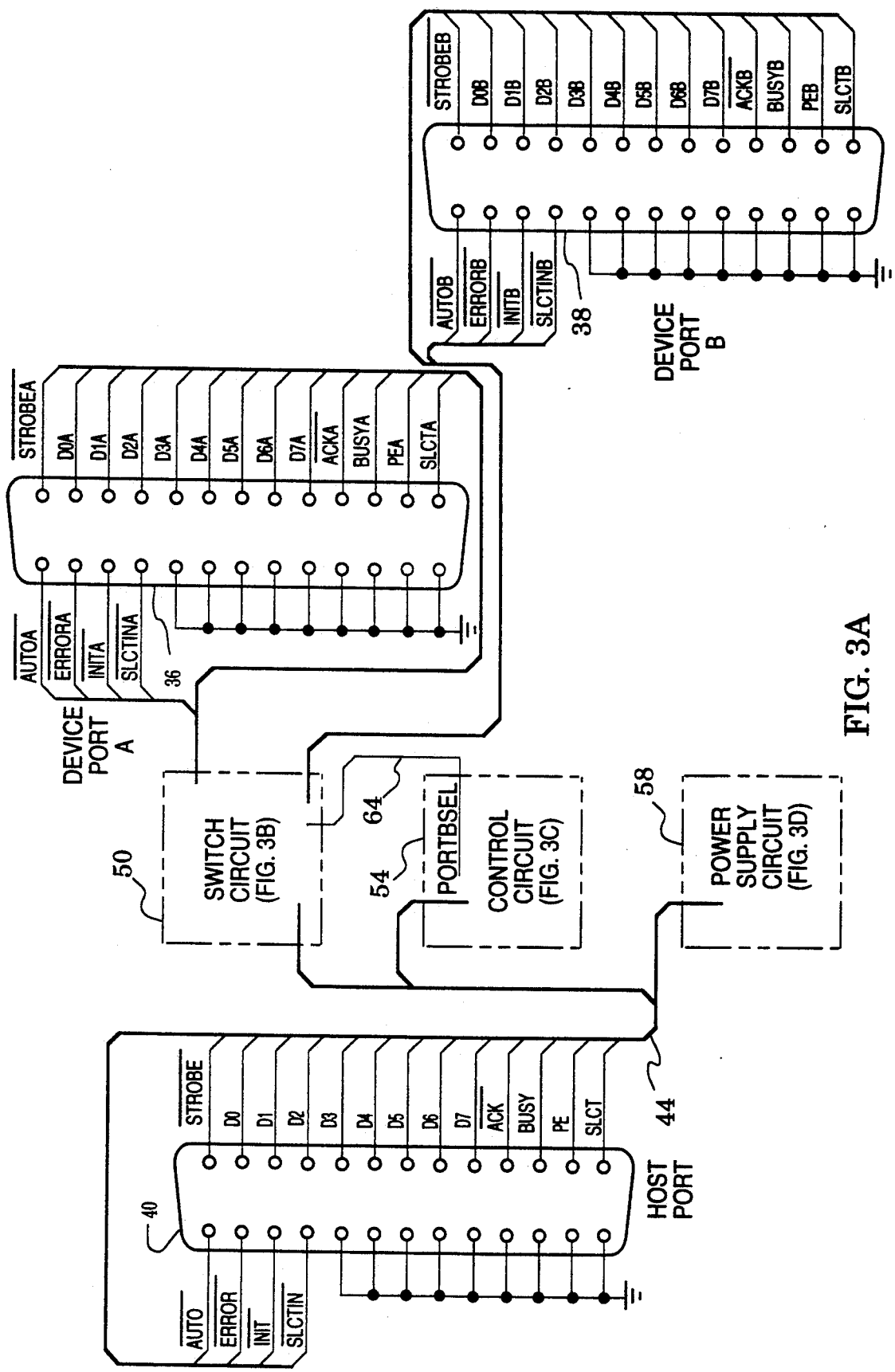
FIG. 3A is a schematic diagram of a preferred multiplexor in accordance with the present invention.
Figure 3C:
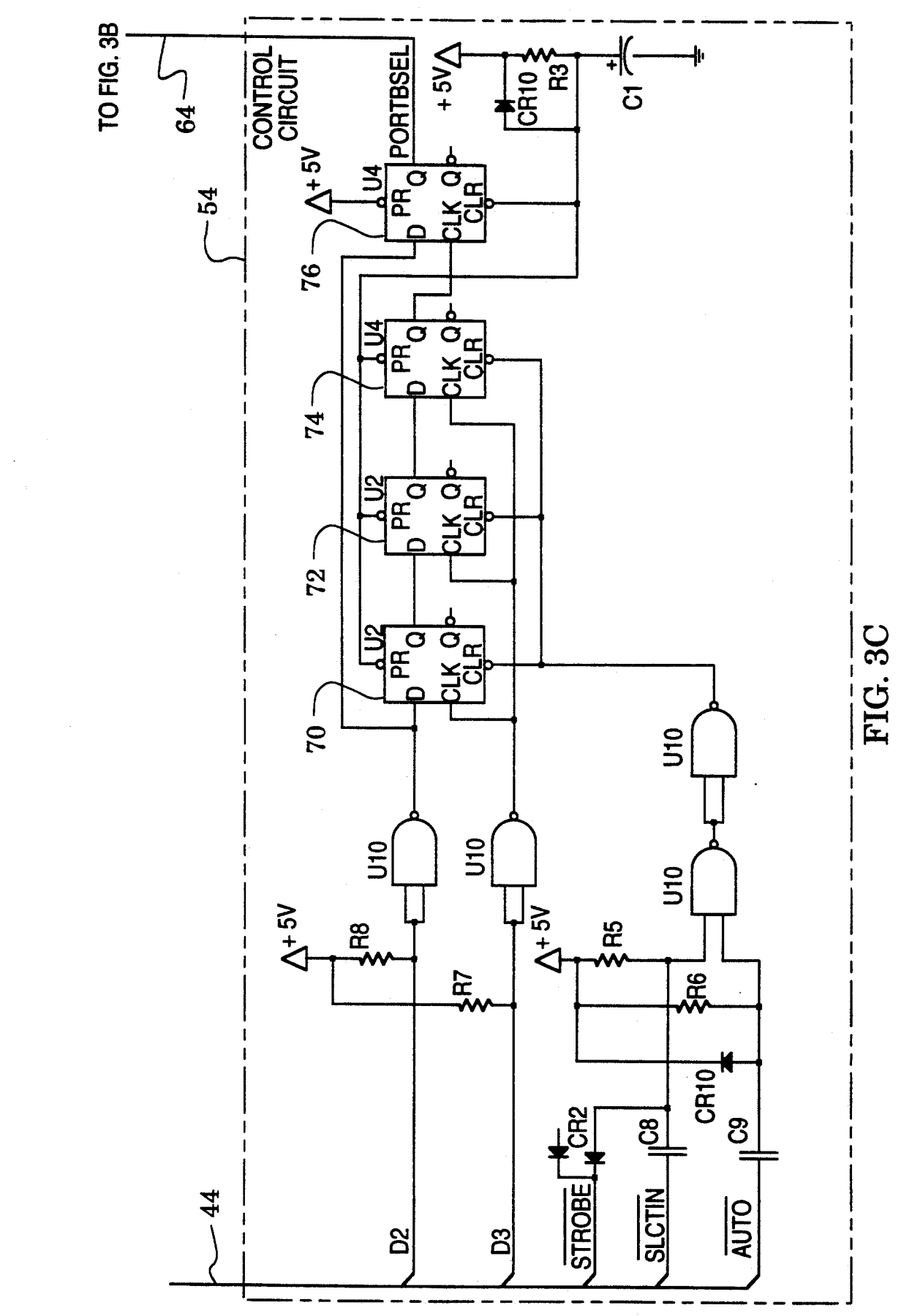
Figure 3D:
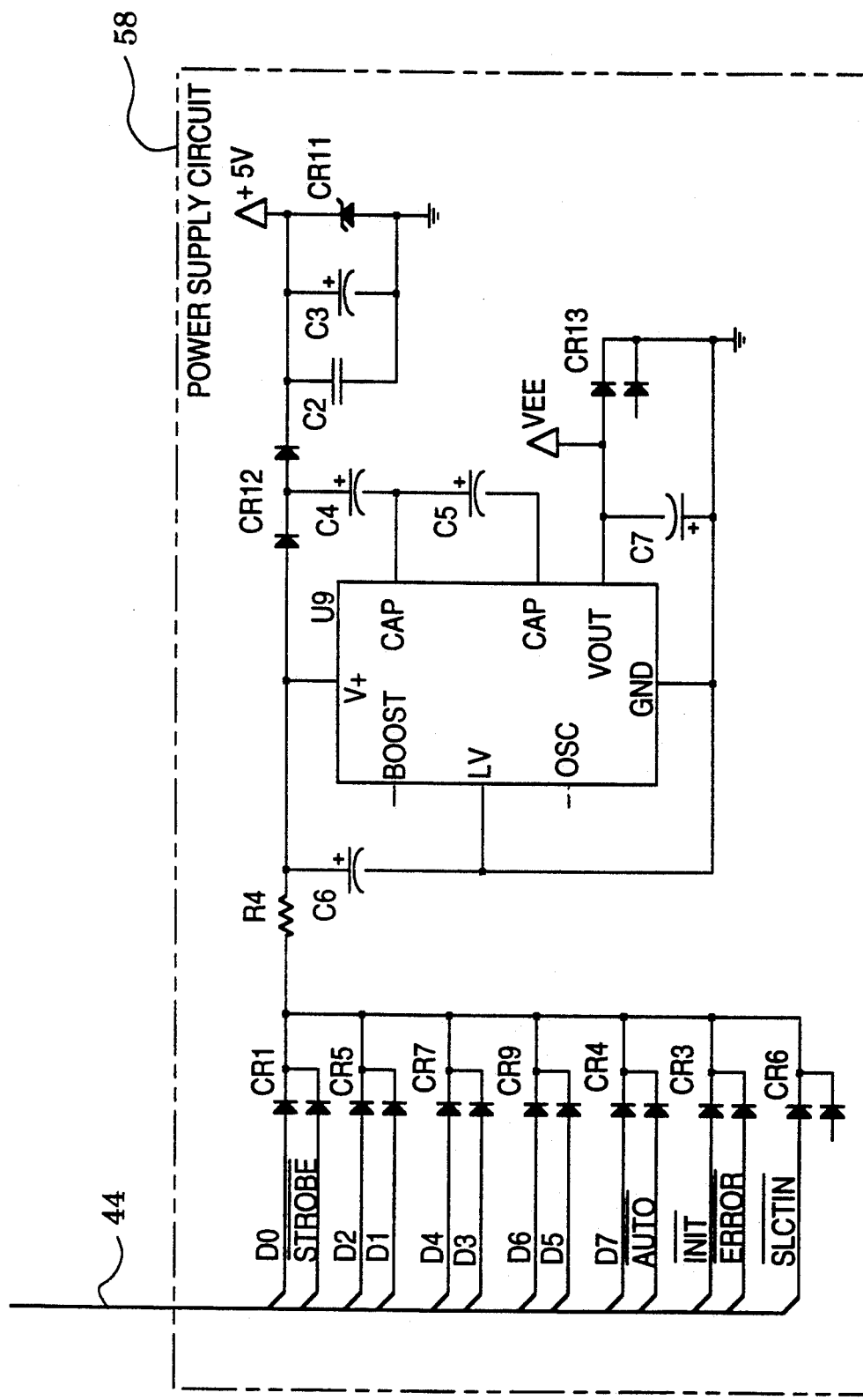

As previously mentioned, the power supply circuit 58 draws electrical energy from the computer connector 22 via the internal signal lines 44 to charge an electrical energy storage means (i.e. capacitance) to produce the voltage levels (i.e. +5 volts and VEE volts) to power circuits 50 and 54. As shown in FIG. 3D, power supply circuit 58 draws electrical energy from the signal lines D0, STROBE (via diodes CR1), D2, D1 (via CR5), D4, D3 (via CR7), D6, D5(via CR9), D7, AUTO (via CR4), INIT, ERROR (via CR3), and SLCTIN via (CR6). In order to draw electrical energy from the signal lines, the lines are periodically placed in a voltage high condition by action of the program 32 executed by computer 20 when the port 22 is not otherwise being used.

The aforementioned signal lines via diodes CR1, 3, 4, 5, 6,7, 9 charge capacitor C6. Capacitor C6 is connected to a switched capacitor voltage converter, depicted in FIG. 3 as integrated circuit U9 implemented by a Linear Technology chip LTC1044. U9 functions to boost the applied input voltage (accumulated across C6) to produce the +5 volts and VEE volt levels.

Figure 4:
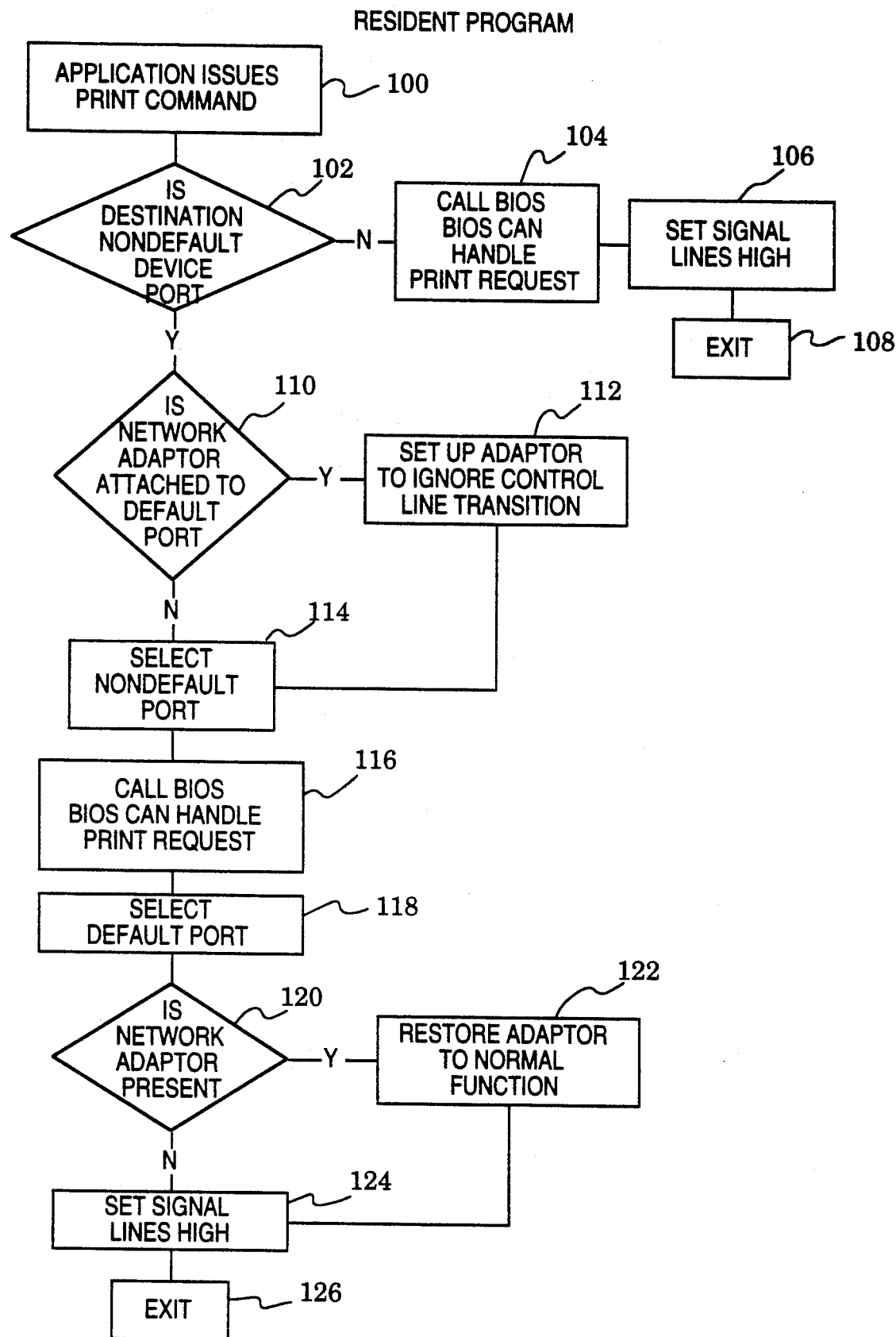
FIG. 4 is a flow chart generally depicting a program executed in accordance with the present invention.

Attention is now directed to FIG. 4 which depicts a flow chart of a preferred resident program 32 executed by host computer 20 in accordance with the present invention.

The resident program of FIG. 4 is initiated by block 100 in response to an application program issuing a print command. Decision block 102 decides whether the print command is addressing the nondefault device port. It will be assumed herein that device port A (FIG. 1) represents the default condition while device port B represents the nondefault port. If the response to decision block 102 is negative, then operation proceeds in a normal manner. That is, a call is issued to the computer's bios in block 104 which handles the print command in normal fashion. Thereafter, in block 106 the signal lines are set high for providing energy to power supply circuit 58. After the signal lines are set high, the program exits (block 108).

If decision block 102 results in an affirmative response, meaning that the destination of the print command is the nondefault device port B, then operation proceeds to decision block 110. Decision block 110 determines whether a network adapter is attached to the default device port A. If it is, then the adapter is instructed via device port A to ignore subsequent transitions on selected ones of the internal signal lines 44.

If the response to decision block 110 is negative, then encoded switching signals are issued by the computer 20 to the internal signal lines 44 to cause control circuit 54 to enable the port select conductor 64. This is represented by block 114.

After the execution of block 114, block 116 is executed which represents a call to the bios and a subsequent normal handling of the print command. After execution of block 116, block 118 is executed which switches switch circuit 50 back to the default port A. After execution of block 118, decision block 120 is executed to determine whether a network adapter is attached to the default port. If so, block 122 is executed to restore the network adapter to its normal state, in other words to reverse the action produced as a consequence of block 112. After the execution of block 120 or block 122, the signal lines are set high, corresponding to the aforementioned action of block 106, to charge the energy storage means of power supply circuit 58. This is represented by block 124. The program is then exited (block 126).

From the foregoing, it should now be recognized that a multiplexor apparatus has been disclosed herein which enables a computer equipped with only a single parallel port to effectively operate, under program control, to address either of two auxiliary parallel ports. An apparatus in accordance with the present invention can be manufactured quite inexpensively in very compact form. It can be readily installed by a user by merely properly physically mounting it on the computer parallel port connector (i.e. 22). Thereafter, the multiplexor operates without any manual intervention by the user, the resident program (FIG. 4) functioning to automatically connect the computer parallel port to either of the auxiliary device ports A or B depending upon the call of the application program. Although a preferred embodiment of the invention has been disclosed herein, it is recognized that modifications and variations may readily occur to those skilled in the art, falling within the spirit and scope of the appended claims.

We claim:

1. Multiplexor apparatus, for use with a computer having a parallel port including an externally accessible standard female parallel port connector, for providing first and second separately addressable auxiliary parallel ports, said multiplexor apparatus comprising:
   a host connector having internal and external signal lines, said external signal lines configured for selectable connection to said external accessible parallel port connector;
   a first device connector having internal and external signal lines, said external signal lines physically configured as a standard female parallel port connector for selectable connection to a peripheral device;
   a second device connector having internal and external signal lines, said external signal lines physically configured as a standard female parallel port connector for selectable connection to a peripheral device;
   nonmanual switch means for selectively connecting said host connector internal signal lines to either said first device connector internal signal lines or said second device connector internal signal lines; and control means responsive to signals on said host connector internal signal lines for controlling said switch means.

2. The apparatus of claim 1 further including:

a housing;

said host, first device, and second device connectors mounted in said housing with the external signal lines of each physically accessible externally of said housing; and wherein, said switch means and control means are mounted in said housing 3. The apparatus of claim 1 further comprising:

energy storage means for supplying electrical power to said switch means and said control means; and means connecting said host connector internal signal lines to said energy storage means for supplying electrical energy thereto.

4. The apparatus of claim wherein said switch means selectively defines either a first state or a second state to connect said host connector internal signal lines to said first device connector and said second device connector internal signal lines, respectively; and wherein said host connector internal signal lines include data lines and control lines; and wherein said control means is responsive to encoded signals on said data lines for switching said switch means from said first to said second state.

5. In combination with a computer having a parallel port including an externally accessible standard female parallel port connector, multiplexor apparatus externally connected to said parallel port connector for providing at least first and second auxiliary parallel ports separately addressable by said computer, said apparatus comprising:

a host connector having internal and external signal lines, said external signal lines detachably connected to said externally accessible parallel port connector;

a first auxiliary parallel port comprising a first device connector having internal and external signal lines, said external signal lines physically configured as a standard female parallel port connector for selectable connection to a peripheral device;

a second auxiliary port comprising a second device connector having internal and external signal lines, said external signal lines physically configured as a standard female parallel port connector for selectable connection to a peripheral device;

nonmanual switch means for selectively connecting said host connector internal signal lines to either said first device connector internal signal lines or said second device connector internal signal lines; and control means responsive to signals on said host connector internal signal lines from said parallel port connector for controlling said switch means.

6. The combination of claim 5 including program means executable by said computer for producing address signals at said computer parallel port connector identifying either said first or said second auxiliary parallel ports; and wherein said control means is responsive to said address signals for controlling said switch means to connect said host connector internal signal lines to the device connector associated with said identified auxiliary port.

7. The apparatus of claim 6 further comprising:

energy storage means for supplying electrical power to said switch means and said control means; and means connecting said host connector internal signal lines to said energy storage means for supplying electrical energy thereto.

8. The combination of claim 7 wherein said program means causes said computer to supply electric current via said computer parallel port connector to said host connector for supplying said electrical energy to said energy storage means.

9. The apparatus of claim 5 wherein said switch means selectively defines either a first state or a second state to connect said host connector internal signal lines to said first device connector and said second device connector internal signal lines, respectively; and wherein said host connector internal signal lines include data lines and control lines; and wherein said control means is responsive to encoded signals on said data lines for switching said switch means from said first to said second state.

* * * * *